July 12, 1949.   J. W. GILLON ET AL   2,475,956
FOCUS ADJUSTING MECHANISM FOR CAMERAS
Filed June 6, 1946   2 Sheets-Sheet 1
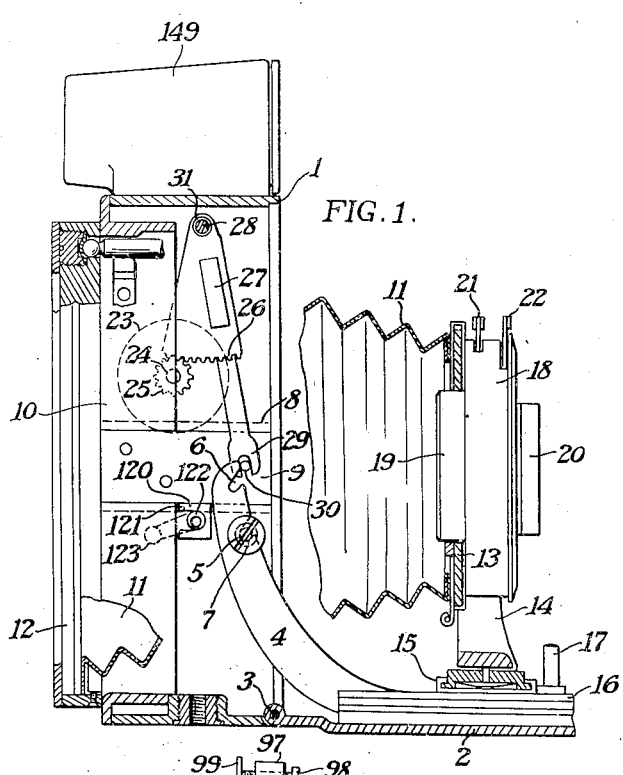
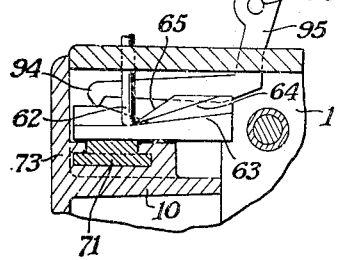
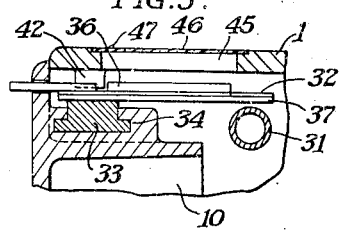
JOHN WARREN GILLON AND GEORGE A. HARADEN
INVENTORS
BY
ATTORNEYS July 12, 1949.　　　　J. W. GILLON ET AL　　　　2,475,956
FOCUS ADJUSTING MECHANISM FOR CAMERAS
Filed June 6, 1946　　　　　　　　　　　　2 Sheets-Sheet 2

JOHN WARREN GILLON AND GEORGE A. HARADEN
INVENTORS

BY
ATTORNEYS

Patented July 12, 1949

2,475,956

UNITED STATES PATENT OFFICE 2,475,956

FOCUS ADJUSTING MECHANISM FOR CAMERAS

John Warren Gillon and George Albert Haraden, Rochester, N. Y., assignors to Eastman Kodak Company, Rochester, N. Y., a corporation of New Jersey Application June 6, 1946, Serial No. 674,882

5 Claims. (Cl. 95—45)

1

This invention relates to photography and more particularly to adjusting mechanism for photographic cameras. One object of our invention is to provide a camera with a convenient and easily-operable mechanism for focusing. Another object of our invention is to provide a camera with a focus-indicating device mounted in a convenient position for use, and to provide a device of the class described which can be quickly altered to care for interchangeable objectives of different focal lengths. Still another object of our invention is to provide an adjusting mechanism for cameras in which the adjustment of the focusing scales for objectives of different focal lengths also automatically adjusts the view finder for parallax for any selected focal length objective. Other objects will appear from the following specification, the novel features being particularly pointed out in the claims at the end thereof.

It has been common practice in photographic cameras to provide a camera body having a hinged bed to which a track has been attached, so that an objective, carried by a lens board, may be drawn out on the track for focusing. In such cameras, it is usually necessary to move the lens board over the bed for focusing and this cannot always be conveniently done. Moreover, the focusing scale and pointer are usually carried by the camera bed in a more or less inconvenient position in which they may be almost obscured by the camera objective and bellows, particularly if a relatively large bellows is used. Our present invention is directed particularly to overcoming these defects by providing an adjusting mechanism on the camera body and by providing the focusing scales in a convenient position on the top of the camera body where they may be readily viewed by an operative using the camera.

Coming now to the drawings wherein like reference characters denote like parts throughout:

Fig. 1 is a side elevation, partly in section, showing a camera constructed in accordance with and embodying our invention, certain parts of the camera being omitted to more clearly illustrate the invention;

Fig. 2 is an enlarged section taken transversely through the camera shown in Fig. 1;

Fig. 3 is an enlarged sectional view through a preferred form of view finder which may be used with our camera;

Fig. 4 is a detailed section showing in part a transverse slide mounted to move in a transverse track carried by the focusing frame of the camera;

Fig. 5 is a view similar to Fig. 4 but showing

Figure 6:
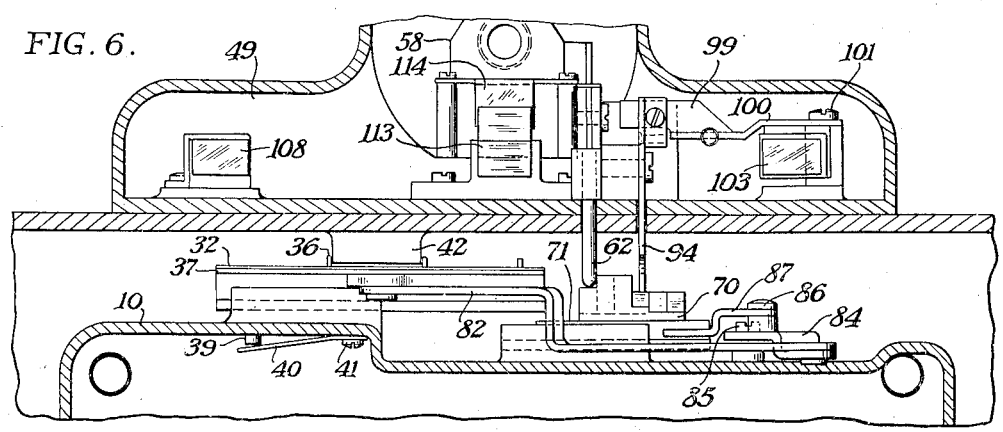
Figure 7:
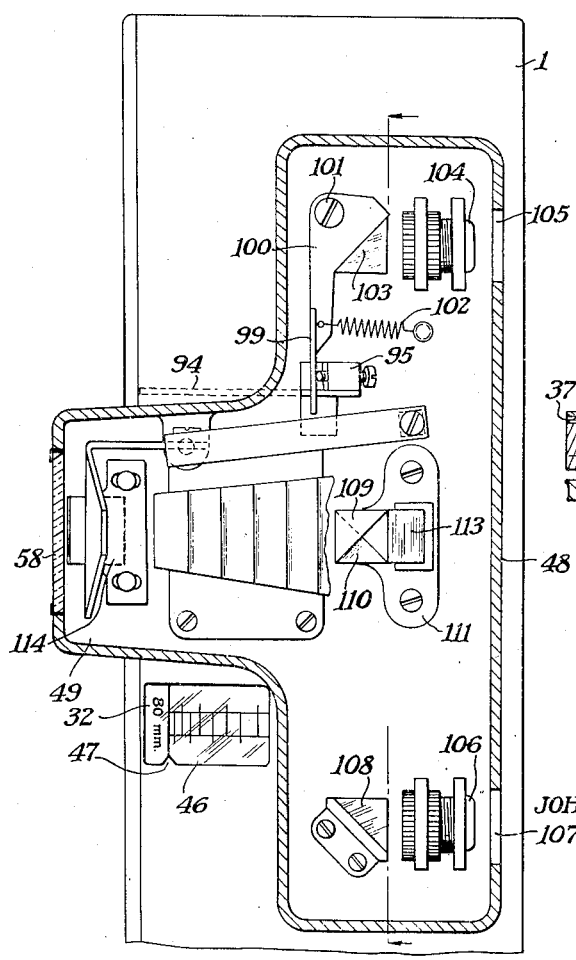
Figure 8:
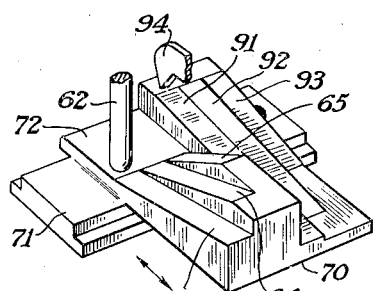
Figure 9:
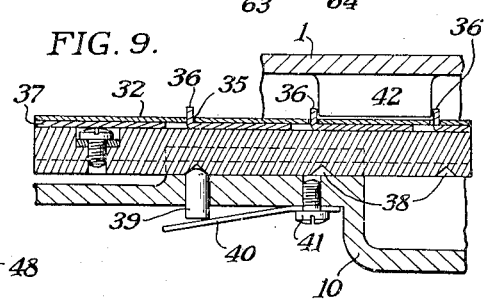

2 the window through which the focusing scale may be viewed in the top of the camera;

Fig. 6 is a longitudinal section through the view finder and range finder housing and the mechanism for operating the view finder and range finder carried by the focusing camera frame;

Fig. 7 is a fragmentary top plan view of the camera showing in transverse section a portion of the range-finder and view finder housing and the mechanism it contains in elevation. The section is taken on line 7—7 of Fig. 3;

Fig. 8 is a fragmentary detailed perspective of the transverse slidable cam block; and Fig. 9 is an enlarged fragmentary section through a portion of the focusing scale and its control mechanism.

Our invention comprises broadly providing a camera body with a frame member slidable in the camera body and movable through a focusing knob to focus the camera while the camera objective remains in a fixed position on the camera bed. To facilitate viewing and to indicate the focal adjustment of the setting at all times, we prefer to provide a focusing scale on the focusing frame of a camera which is moved when the frame is moved; this focusing scale being located beneath a window through which the focal setting can be determined at all times. By sliding the scale transversely, differently graduated scale elements may be brought beneath the window to indicate the focal setting for objectives of different focal length which may be interchangeably accommodated on the lens board of the camera. Each lens of different focal length may be moved to an infinity position over the camera bed and, of course, this infinity position will differ for different lenses in accordance with the characteristics of the objective and particularly the location of the nodal points of the objective, as is well known in the art.

More specifically, our invention may be embodied in a camera as illustrated in the drawings in which there is a camera body 1 consisting of a generally rectangular frame to which the camera bed 2 may be hinged at 3. Bed braces 4 may be hingedly attached to the bed and may be provided with one or more notches 5 and 6, either one of which may engage a stud 7 to hold the camera bed 2 either at right angles to the camera body, or in a lowered position, which may be useful with short focal length lenses. The bed braces 4 may be held against the stud 7 by means of a suitable spring, not shown.

The camera body 1 is provided with a track 8 consisting of spaced rails on which a slide 9 may move, one of these slides being carried on each side of a frame 10 which is of generally rectangular shape, and which moves to focus the camera. A bellows 11 is attached to the rear frame 12 of the focusing frame 10, this rear frame having ways to receive a light-sensitive carrier of any known type, such as a film pack adapter, a plate holder, a cut film holder, or a roll holder.

The bellows 11 is likewise attached to a lens board 13 which is carried by the yoke 14 carried by a lens carriage 15 mounted to slide on a track 16 on the camera bed 2. Handles 17 may be used for drawing out the lens carriage in a known manner. A shutter 18 may carry an objective of known focal length in a rear cell 19 and a front cell 20, and the shutter may be provided with the usual setting lever 21 and shutter trigger 22.

In order to focus the camera, we provide a focusing knob 23 on an outside wall of the camera, this knob being carried by a shaft 24 to which a pinion 25 is attached. This pinion meshes with a gear segment 26 attached to an arm 27, pivoted at 28 to the camera body and having a fork 29 engaging a pin 30 on the slide 9, so that when the knob 23 is turned, the slides 9 on each side of the camera will move in the tracks 8 and move the focusing frame to and from the camera body 1.

The pivotal points 28 for the gear segments 26 preferably support a tubular shaft 31 which extends across the top of the camera, as best shown in Fig. 2. Thus, on each side of the camera we provide arms 27 which are attached to the tubular shaft 31 and yokes 29 engaging pins 30, so that the focusing frame 10 is moved from both sides at once. While our preferred form only utilizes one focusing knob 23 on one side of the camera, it is obvious that two of these knobs could be provided, if desired.

When the focusing frame 10 is moved back and forth by the focusing knob 23, we automatically adjust the focus-indicating scales 32 because these scales are mounted on a transverse slide 33 movable on a transverse track 34 carried by the focusing frame 10 of the camera body, as shown in Figs. 2, 5, and 9. In our present embodiment, we have divided the focusing scale into three sections; one section being graduated into focal distances for an 80-mm. lens; a second section being graduated into units of distance for a 110-mm. lens, and a third section being graduated into focal distances for a 143-mm. lens. These lenses may be purchased as a set for this particular camera; or, if lenses of other focal lengths are provided, this can be readily taken care of by providing separate focusing scales 32 which may be attached to the transverse slide 33.

We find it convenient to provide the focusing scales 32 on a single sheet of material, such as paper, or a cellulosic sheet, on which the graduations may be applied by printing, engraving, or the like. In the present instance, this sheet, as best shown in Fig. 9, is provided with three slots 35, each of which is adapted to receive an upstanding lug 36 to hold the scale 32 in position. The upstanding lugs 36 are formed upwardly from a plate 37, this plate being carried by the slide 33 and including a series of notches 38, any one of which may be engaged with a pin 39 pressed upwardly by a leaf spring 40 attached by a screw 41 to the focusing frame 10. Thus, it is a simple matter to apply a focusing scale 32 to its carrier and a scale graduated into the required units can be placed on the camera by merely dropping the sheet bearing the focal graduations over the upstanding lugs 36.

The upstanding lugs 36 have an additional function. The camera body 1 is provided with a downwardly-extending lug 42 which fits between any pair of upstanding lugs 36, and which is so positioned that it will lie between any pair of lugs 36 in all positions of the focusing frame 10 relative to the camera body 1 except when the focusing frame has been completely telescoped into the camera body and the focusing scales indicate an infinity position. In this case, as illustrated in Fig. 5, the lug 42 extends slightly beyond the end of the upstanding lugs 36. Thus, it is only when the camera is in an infinity position that the focusing scales can be moved transversely of the camera body. This is important, for it prevents improper adjusting of the parallax-free view finder, as will be hereinafter more fully described.

As also shown in Fig. 5, the camera body 1 is provided with a window 45, preferably covered with a transparent sheet of material 46, on which a pointer 47 is diagrammatically illustrated. This pointer may be printed on the transparent window covering 46 in any desired manner, or, it may be placed on the inside of the window, but, in any event, above the focusing scales 32. When the camera is in use, the graduations on the focusing scales 32 will appear directly beneath the window 45 in the top of the camera in a very convenient position for observation.

In the present embodiment of our invention, there is a view finder and range finder housing 48, mounted on the top wall of the camera body 1. This housing has a generally tubular center section 49 which, as best shown in Fig. 3, has a finder objective 50 in an oscillatable front cell 51. This oscillatable front cell may include a mask 52 and a knurled edge 53 by which the cell may be moved through 90 degrees, being held in either a position for horizontal or vertical views by means of two notches 54, either one of which may be engaged by a spring-pressed ball 55 to form a snap latch. There is a rear window 56 beneath which there is an eyepiece 57. This eyepiece carries a frame 58 having a view opening 59, this frame being carried by an arm 60 attached by a screw 61 to a slidable post 62. The slidable post may engage any one of three cams— 63, 64, or 65, as shown in Fig. 4. Thus, when the focusing frame 10 is moved back and forth with respect to the camera body 1 for focusing, one of the cams, by engaging the post, will regulate the position of the view opening 59 and, consequently, the angle of inclination of sight; thus, automatically correcting for parallax.

Fig. 8 shows the post 62 and the cam block 70 carrying the cams 63, 64, and 65. It will be noticed that this cam block is attached to a slide 71 and that there is a plane flat surface 72 at the foot of each of the cams 63, 64, and 65. The reason for this is that since the post 62 might be damaged if the cam block 70 could be moved while the post 62 engaged one of the cams, an arrangement has been made by which the sliding movement can only occur when the cam block 70 is in an infinity position, in which position the post 62 may rest on the flat surface 72. In order to accomplish this, the cam block 70 is mounted on a slide 71 which is movable in a track 73 on the focusing frame 10 of the camera, as shown in Fig. 4. In order to move the cam block so that the proper cam will be in alignment with the post 62, when the desired focusing scale is beneath the window 45, we provide a linkage for connecting the focusing scales and the cam block, which is best shown in Fig. 2. The slide 33 carrying the focusing scales is provided with an ear 80 to which there is pivoted at 81 one end of a link 82 which, in turn, is pivoted at 83 to a link 84 pivotally attached at 85 to the focusing frame 10. Link 84 carries a stud 86 to which a link 87 is attached, this link being attached to a stud 88 carried by the cam block slide 71. Thus, when the focusing scale is moved a distance equal to the width of one focusing scale, or the distance between two upstanding lugs 36, the cam block slide 71 is moved a distance equal to the width of one of the cams 63, 64, or 65. It is also obvious that since the focusing scales 32 may be only moved on their slide 33 when they are at an infinity position because of the lug 42 and the lugs 36 that the focusing block 70 can only be moved when the pin 62 rests on the flat surface 72. Thus, damage to the parallax-correcting mechanism is automatically prevented.

In order to move both the focusing scale and the cam block, we prefer to provide a handle 89 extending out through a slot 90 in the back of the focusing frame 10; this slide merely serving to move the focusing scales and cam block engaging any one of the detents 38 with the spring pin 39 to hold the parts in an adjusted position.

The cam block 70 is also provided with a second series of cams 91, 92, and 93, all as shown in Fig. 8. These cams are for adjusting a cam follower 94 which is on the end of a bell crank lever 95, pivoted at 96 to the camera body 1. The bell crank lever carries an arm 97 on which there is an adjusting screw 98 which contacts with one end 99 of a bell crank lever 100, pivoted at 101 to the range finder and view finder housing 49. A spring 102 holds the bell crank lever 100 against the adjusting screw 98.

The lever 100 carries a prism 103 behind an adjustable lens 104 of the range finder and the housing is provided with a window 105 through which light rays may pass. A second and similar lens 106 lies behind the housing window 107 and in front of a prism 108 carried by the housing 49. The prisms 103 and 108 reflect light rays to the prisms 109 and 110 carried by the bracket 111 and a viewing lens and prism 112 and 113 are used to view split images through an eyepiece 114 which can be viewed through the window 56. However, the range finder forms no part of our present invention, but has only been described to complete a picture of the mechanism operated by the cam block 70.

If desired, the camera may be equipped only with a view finder 149, as indicated in Fig. 1, in which case the casing would only contain the parts relating to the view finder and would omit all of the range finder construction. In such a case, the cam block 70 would be provided with only three cams for operating the post 62; these cams, of course, being similar to the cams 63, 64, and 65. The cams 91, 92, and 93 would be omitted.

As will be seen from the above description, we have provided a simple adjusting mechanism which can be used to focus a frame in the camera body while the objective remains stationary on the camera bed. In addition, if desired, the focusing frame 10 may be latched in any selected position by means of a shoe 120, as shown in Fig. 1; this shoe having a U-shaped opening 121 which may be engaged by a cam 122 operated by a locking handle 123 on the outside of the camera body, just beneath the focusing knob 23. Thus, when the focusing knob is turned to the desired focal distance, the handle 123 may be drawn up, causing the shoe 120 to latch the slide 9 in its set position. Reverse pressure on the handle 123 will release the latch and permit the focusing frame to move freely in the camera body.

Certain features of the mechanism for preventing the improper adjustment of the finder and range finder are shown in our copending application entitled Camera adjusting mechanism, Ser. No. 674,881, filed June 6, 1946, in the names of Gillon and Haraden, and reference can be had to this application for these features.

In addition, the multiplying linkage for moving the cam block and focusing scales at different ratios and the device for preventing movement of the slides except when at an infinity position, is disclosed and claimed in copending application Ser. No. 674,853, filed June 6, 1946, for Camera interlocking mechanism, in the names of McAdam and Bauer.

We claim:

1. In a focusing camera including a camera body, the combination with a frame slidably mounted in the camera body, a bed hingedly attached to the camera body, an objective, means for supporting the objective at a selected distance from the camera body including a lens carriage slidable over the bed and carrying one end of a bellows, the other end of which is attached to the slidably-mounted frame, a transverse shaft carried by the camera body, a gear segment keyed to the shaft, a focusing knob mounted on the camera body and including a pinion meshing with the gear segment for turning the shaft, connections between the shaft and the slidably-mounted frame for moving the frame relative to the camera body for focusing, a window in the camera body, a pointer carried thereby, and a focusing scale located beneath the window and its pointer carried by the frame slidably mounted in the camera body for indicating the focal setting thereof.

2. In a focusing camera including a camera body, the combination with a frame slidably mounted in the camera body, a bed hingedly attached to the camera body, an objective, means for supporting the objective at a selected distance from the camera body including a lens carriage slidable over the bed and carrying one end of a bellows, the other end of which is attached to the slidably-mounted frame, a transverse shaft carried by the camera body, a gear segment keyed to the shaft, a focusing knob mounted on the camera body and including a pinion meshing with the gear segment for turning the shaft, connections between the shaft and the slidably-mounted frame for moving the frame relative to the camera body for focusing, a window in the camera body, a pointer carried thereby, and a focusing scale located beneath the window and its pointer, a transverse slide mounted on the frame slidably mounted in the camera body, said slide carrying the scale, and means for moving the slide.

3. In a focusing camera including a camera body, the combination with a frame slidably mounted in the camera body, a bed hingedly attached to the camera body, an objective, means for supporting the objective at a selected distance from the camera body including a lens carriage slidable over the bed and carrying one end of a bellows, the other end of which is attached to the slidably-mounted frame, a transverse shaft carried by the camera body, a gear segment keyed to the shaft, a focusing knob mounted on the camera body and including a pinion meshing with the gear segment for turning the shaft, connections between the shaft and the slidably-mounted frame for moving the frame relative to the camera body for focusing, a window in the camera body, a pointer carried thereby, and a focusing scale located beneath the window and its pointer, a transverse slide mounted on the frame slidably mounted in the camera body, said slide carrying the scale, means for retaining the slide in transverse preselected positions, and a handle for manually moving the slide to its preselected position.

4. In a focusing camera including a camera body, the combination with a frame slidably mounted in the camera body, a bed hingedly attached to the camera body, an objective, means for supporting the objective at a selected distance from the camera body including a lens carriage slidable over the bed and carrying one end of a bellows, the other end of which is attached to the slidably-mounted frame, a transverse shaft carried by the camera body, a gear segment keyed to the shaft, a focusing knob mounted on the camera body and including a pinion meshing with the gear segment for turning the shaft, connections between the shaft and the slidably-mounted frame for moving the frame relative to the camera body for focusing, a window in the camera body, a pointer carried thereby, and a focusing scale located beneath the window and its pointer, a transverse slide mounted on the frame slidably mounted in the camera body of a number of times the length of the width of the window, focusing scales mounted on the slide, and means for operatively positioning a selected scale beneath the focusing window on the camera body.

5. In a focusing camera including a camera body, the combination with a frame slidably mounted in the camera body, a bed hingedly attached to the camera body, an objective, means for supporting the objective at a selected distance from the camera body including a lens carriage slidable over the bed and carrying one end of a bellows, the other end of which is attached to the slidably-mounted frame, a transverse shaft carried by the camera body, a gear segment keyed to the shaft, a focusing knob mounted on the camera body and including a pinion meshing with the gear segment for turning the shaft, connections between the shaft and the slidably-mounted frame for moving the frame relative to the camera body for focusing, a window in the camera body, a pointer carried thereby, and a focusing scale located beneath the window and its pointer carried by the frame slidably mounted in the camera body for indicating the focal setting thereof, and a latch operable from the outside of the camera body for holding the camera body and frame in a selected position.

JOHN WARREN GILLON.
GEORGE ALBERT HARADEN.

REFERENCES CITED

The following references are of record in the file of this patent:

UNITED STATES PATENTS

| Number | Name | Date |
|---|---|---|
| 428,448 | Blair | May 20, 1890 |
| 741,694 | Mutschler | Oct. 20, 1903 |
| 1,486,231 | Cox | Mar. 11, 1924 |
| 2,012,515 | Mitchel | Aug. 27, 1935 |
| 2,220,021 | Ort | Oct. 29, 1940 |
| 2,259,415 | Eddy | Oct. 14, 1941 |
| 2,261,421 | Steiner | Nov. 4, 1941 |
| 2,265,896 | Dalotel | Dec. 9, 1941 |
| 2,274,441 | Williams | Feb. 24, 1942 |
| 2,300,245 | Bell | Oct. 27, 1942 |
| 2,386,575 | Simmon et al. | Oct. 9, 1945 |